United States Patent [19]

Breault

[11] Patent Number: 4,851,377
[45] Date of Patent: Jul. 25, 1989

[54] FUEL CELL, A FUEL CELL ELECTRODE, AND A METHOD FOR MAKING A FUEL CELL ELECTRODE

[75] Inventor: Richard D. Breault, Coventry, Conn.

[73] Assignee: International Fuel Cells Corporation, South Windsor, Conn.

[21] Appl. No.: 182,267

[22] Filed: Apr. 15, 1988

Related U.S. Application Data

[62] Division of Ser. No. 62,666, Jun. 16, 1987.

[51] Int. Cl.[4] .............................................. H01M 4/88
[52] U.S. Cl. .................................... 502/101; 427/115; 29/623.5
[58] Field of Search ....................... 502/101; 29/623.5; 252/182.1; 429/42, 44; 427/115, 350, 256

[56] References Cited

U.S. PATENT DOCUMENTS

| | | | |
|---|---|---|---|
| 3,857,737 | 12/1974 | Kemp et al. | 252/182.1 |
| 4,175,055 | 11/1979 | Goller et al. | 252/182.1 X |
| 4,233,181 | 11/1980 | Goller et al. | 427/115 X |
| 4,287,232 | 9/1981 | Goller et al. | 427/115.1 |

Primary Examiner—Anthony Skapars
Attorney, Agent, or Firm—Kevin E. McVeigh

[57] ABSTRACT

A fuel cell electrode having a non-uniform catalyst loading is disclosed. The electrode has a layer of a hydrophobic polymer and a platinum or platinum alloy catalyst supported on the surface of a porous substrate. The thickness of the layer increases along one axis of the surface so that the electrode has a catalyst loading that increases along the one axis of the surface. A process for making such an electrode having steps of contacting the upper surface of a porous substrate with a mixture of a hydrophobic polymer and a carbon supported catalyst, and establishing a reduced pressure distribution along the lower surface of the porous substrate to cause the catalyst mixture to be deposited as a non-uniform layer on the upper surface of the substrate. A fuel cell utilizing such an electrode is also disclosed.

8 Claims, 1 Drawing Sheet

FUEL CELL, A FUEL CELL ELECTRODE, AND A METHOD FOR MAKING A FUEL CELL ELECTRODE

DESCRIPTION

This is a division of copending application Ser. No. 062,666 filed on June 16, 1987.

1. Technical Field

The field of art to which this invention pertains is fuel cell electrodes.

2. Background Art

A fuel cell is a device for directly converting the chemical energy of a fuel into electrical power. A fuel cell comprises an anode, a cathode, and an electrolyte impregnated matrix. The matrix is disposed between the two electrodes. A catalyst layer is disposed on the electrolyte-facing surface of each electrode.

In the operation of a typical fuel cell, a hydrogen containing gas is fed to the back surface of the anode and an oxygen containing gas is fed to the back surface of the cathode. The gases diffuse through the electrodes to react with the electrolyte in the presence of the catalyst to yield water, heat and electrical energy.

At the anodic catalyst layer the hydrogen gives up electrons in an electrochemical oxidation reaction. The electrical current so generated is conducted from the anode through an external circuit to the cathode. At the cathodic catalyst layer the electrons are electrochemically combined with the oxygen. A flow of ions through the electrolyte completes the circuit. Reaction rates vary with location on the electrode and are dependent upon such local factors as reactant and product concentrations and temperature.

The variation in reaction rate gives rise to cost and performance problems. The current density across a given area of the electrode is proportional to the local reaction rate. For example, in a typical cell having an average current density of 300 amps per square foot (ASF), the current density may vary over the surface of an electrode from about 150 ASF to about 450 ASF. The non-uniform current density reduces performance because the deviation from theoretical (Tafel) behavior increases with increasing current density.

Furthermore, the overall reaction in the cell (i.e. formation of water) is exothermic. The rate of heat generation is dependent upon the reaction rate and the heat flux across a given area of an electrode is proportional to the local reaction rate. The design of means for cooling a fuel cell is typically based on the projected peak heat flux. The provision of cooling means sufficient to accommodate the peak heat flux greatly increases the cost associated with a fuel cell.

What is needed in this art is a fuel cell electrode that overcomes some of these difficulties.

DISCLOSURE OF INVENTION

A fuel cell electrode with a non-uniform catalyst loading is disclosed. The electrode comprises a layer supported on the surface of a porous substrate. The layer comprises a hydrophobic polymer and a catalyst. The catalyst is selected from the group consisting of platinum and alloys of platinum. The layer has a catalyst loading per unit area of the surface that increases along the one axis of the substrate. The electrode provides a substantially uniform current density and substantially uniform heat flux across the surface of the electrode during use.

A further aspect of the disclosure comprises an improved fuel cell using at least one electrode having a catalyst layer that increases in catalyst loading in the direction of the bulk flow of gas over the electrode.

Another aspect of the disclosure comprises a process for applying a catalyst layer to the surface of a porous substrate comprising contacting the upper surface of the substrate with a mixture of hydrophobic polymer and catalyst and establishing a selected distribution of reduced pressure over the lower surface of the substrate to cause the mixture to be deposited in a non-uniform layer on the upper surface of the substrate.

The foregoing and other features and advantages of the present invention will become more apparent from the following description and accompanying drawings.

BEST MODE FOR CARRYING OUT THE INVENTION

Figure 1:
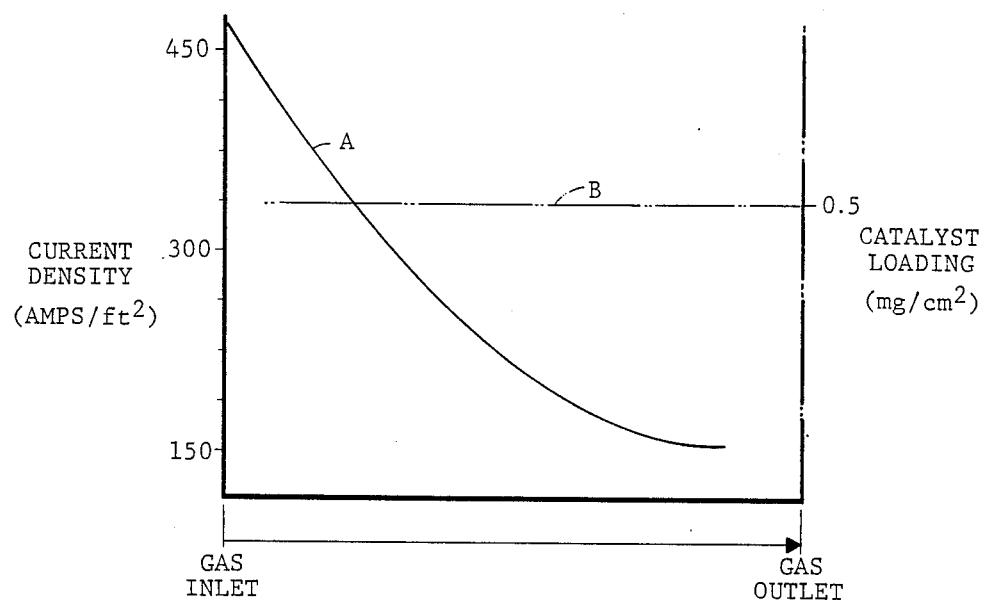
FIG. 1 shows the relationship of catalyst loading, B, and current density, A, to location on a conventional electrode.

While any porous substrate that is compatible with the fuel cell environment may be used with the present invention, substrates already successfully used in fabricating fuel cell electrodes are preferred substrates. For example, a nickel screen would provide a suitable substrate for an electrode intended for use in a base electrolyte cell. Carbon paper is the preferred substrate for fabricating electrodes to be used in phosphoric acid cells.

Carbon paper suitable for use as the substrate of the present invention may be purchased or prepared. Suitable carbon papers are available from a number of commercial sources, for example, Union Carbide Corp., Stackpole Carbon Company and Kureha Corporation.

Carbon paper substrates may be prepared from resin bonded carbon fibers by known paper making techniques as disclosed in commonly owned U.S. Pat. No. 3,972,735. Such carbon papers are typically selectively wetproofed by impregnation with hydrophobic polymer. The wetproofing allows gas flow through the substrate while allowing the substrate to simultaneously hold electrolyte in order to accommodate electrolyte volume changes during cell operation.

A preferred method for preparing carbon paper substrates is the process taught by commonly owned U.S. Pat. No. 4,426,340, the disclosure of which is incorporated herein by reference. Electrode substrates prepared by the preferred process do not require wetproofing, as the flow of gases and flow of electrolyte through the substrate are controlled by selection of the porosity and pore size of the substrate. The process comprises selecting dry mixtures of carbon fibers and thermosetting resin, depositing the mixtures in a mold, and heating and compacting the mixtures to bond the fibers. The article so formed is then carbonized in an inert atmosphere by increasing the temperature at a rate of about 40° C. per hour to 950° C. and holding at 950° C. for about 1 hour. The substrate may then be graphitized by heating at 2800° C.

The preferred process provides considerable latitude in the design of electrode substrates and allows selection of porosity and pore sizes that are adopted to specific applications. In general, it is desirable to maximize the porosity of the substrate while preserving the physical strength of the substrate. Carbon substrates having a porosity of between 65% and 80% are preferred with porosity between 70% and 80% being most preferred. A mean pore size of between 20 microns and 70 microns is preferred.

The catalyst layer of the present invention comprises a mixture of hydrophobic polymer and a catalyst.

The hydrophobic polymer of the present invention may be any hydrophobic polymer compatible with the electrolyte to be used in the fuel cell. Compatible fluorinated polymers, such as polytetrafluoroethylene (PTFE) and fluorinated ethylene propylene (FEP), having molecular weights of about $1 \times 10^6$ or greater are preferred. PTFE is most preferred and most widely used in the art. Suitable PTFE polymers are TFE-6 or TFE-30, each manufactured by DuPont. TFE-6 is a dry PTFE powder having a molecular weight of about $1 \times 10^6$ and a particle size of greater than 100 microns. TFE-30 is an aqueous dispersion of about 0.2 micron size PTFE particles and a surfactant.

Platinum metals and alloys of platinum are suitable catalysts for use with the present invention. Platinum is the preferred catalyst for use in the anodic catalyst layer. The platinum may be dispersed upon a support by conventional methods as, for example, that disclosed in commonly owned U.S. Pat. No. 3,857,737. Binary alloy catalysts, such as platinum-vanadium and platinum chromium, and ternary alloy catalysts, such as platinum-chromium-cobalt are preferred for use as cathodic catalysts. Methods of making platinum-vanadium catalysts are disclosed in commonly owned U.S. Pats. No. 4,202,934 and No. 4,513,094, a method of making platinum-chromium catalysts is disclosed in commonly owned U.S. Pat. No. 4,316,944 and a method of making platinum-chromium-cobalt catalysts is disclosed in commonly owned U.S. Pat. No. 4,447,506. The disclosures of the above cited U.S. Patents are incorporated herein by reference.

The catalyst of the present invention is preferably dispersed upon an electrically conductive support material having a specific surface area of greater than 50m²/gram.

Carbon blacks, such as acetylene black, and oil blacks are preferred catalyst supports. An oil black known as Vulcan XC-72, available from Cabot Corp., is the most preferred catalyst support. While the as received carbon black is the preferred support for the anodic catalyst, it has been found that graphitized carbon black is preferable for the cathodic catalyst support due to its better resistance to corrosion. Carbon black particles may be graphitized by heating at a temperature between 2500° C. and 3000° C. for about 1 hour in an inert atmosphere.

The hydrophobic polymer and catalyzed carbon particles may be blended by any convenient technique that will produce a uniform mixture. For example, an aqueous suspension may be formed by conventional techniques, such as agitating mixture of catalyzed carbon particles, an aqueous dispersion of PTFE particles and water in a commercial Waring blendor. The aqueous suspension is then caused to floc, such as by heating or adding a floccing agent.

Alternatively, the aqueous co-dispersion may be flocced, dried and pulverized to produce a dry, powdered mixture of polymer and catalyzed carbon, as described in commonly owned U.S. Pat. No. 4,287,232. A dry mixture of polymer and carbon particles may also be produced by blending and pulverizing a mixture of dry hydrophobic polymer powder and catalyzed carbon particles as disclosed in commonly owned U.S. Pat. No. 4,175,055. A process for preparing a dry mixture of hydrophobic polymer and catalyzed carbon that is preferred for continuous production is disclosed in commonly owned U.S. Pat. No. 4,233,181.

The preferred method for applying the hydrophobic polymer and catalyzed carbon to the substrate is a modification of the cloud chamber technique disclosed in commonly owned U.S. Pat. No. 4,287,232, Goller et al, the disclosure of which is incorporated herein by reference.

A layer of dry catalyzed carbon and hydrophobic polymer powder is deposited on the surface of the electrode substrate by dispersing the powder as a fluidized cloud in a chamber over the substrate and pulling the powder onto the upper surface of the substrate by drawing a vacuum under the substrate. The fluidized cloud to which the upper surface of the substrate is exposed comprises a catalyst composition and a carrier gas. When a pressure differential is established across the substrate by pulling a vacuum on the lower surface of the substrate, a flow of carrier gas through the substrate is obtained at a rate proportional to the pressure differential. The catalyst composition is deposited on the upper surface of the substrate at a rate proportional to the flow of the carrier gas. In the process described in the above references, the substrate is supported by a vacuum base that allows exposure of the lower surface of the plate to a uniform reduced pressure. A uniform distribution of the catalyst is obtained in accord with the uniform pressure differential across the substrate.

In the process of the present invention, the lower surface of the substrate is exposed to a selected distribution of reduced pressure to produce a pressure differential distribution across the substrate that varies with location on the substrate. The rate of carrier gas flow through the substrate and the rate of catalyst deposition on the surface of the substrate would then correspond to the local pressure differential, resulting in the desired non-uniform catalyst loading on the electrode.

A means for subjecting the lower surface of the substrate to a selected distribution of reduced pressure would include a vacuum base having more than one independent zone, wherein the pressure on the vacuum side of the base may be independently controlled for each zone. A porous vacuum base having a selected permeability distribution that varies with location on the base wherein the vacuum side of the base is subjected to a uniform reduced pressure would also be suitable.

Several other conventional methods for applying the catalyst layer to the substrate, such as direct filtration or filter transfer, may be similarly modified to produce an electrode according to the present invention. The necessary modification would, for example, involve establishing a distribution of reduced pressure across the lower surface of the substrate in the case of direct filtration, or across the lower surface of the filter paper in the case of the filter transfer method.

The catalyst loading increases along one axis of the surface of the catalyst layer of the electrode of the present invention. The simplest embodiment of the electrode of the present invention would be an electrode having a different, uniform catalyst loading over each of two zones. For example, a conventional electrode having a uniform catalyst loading of 0.5 milligrams per square centimeter (mg/cm$^2$) might be replaced by an electrode of the present invention wherein half of the catalyst layer has a catalyst loading of 0.25mg/cm$^2$ and the other half of the catalyst layer has a catalyst loading of 0.75mg/cm$^2$. More refined examples of the concept would include multizone catalyst distributions and smooth, monotonically increasing catalyst distributions. The distribution of catalyst required for optimization of a particular application must be established by analysis and experimentation, but even a simple two-zone distribution of catalyst should provide significant performance advantages over conventional electrodes.

A fuel cell according to the present invention comprises two electrodes, an electrolyte layer disposed between the two electrodes and in contact with the catalyst layer of each electrode, and a means for conducting a substantially unidirectional bulk flow of a gas over the back surface of each electrode, wherein at least one of the two electrodes is an electrode according to the present invention disposed such that the catalyst loading increases in the direction of gas flow.

In the operation of a fuel cell, the local current density and local heat flux are each dependent upon the local reaction rate. The local reaction rate occurring in the catalyst layer may be expected to increase with increasing local concentration of reactants, increasing catalytic surface area, and increasing temperature.

At the gas inlet side of an electrode, the gas stream is reactant rich. As the gas stream approaches the outlet side of the cell, the gas is depleted in reactants. In a conventional fuel cell having electrodes with uniform catalyst loading, the reaction rate tends to be high at the gas inlet side and dramatically decreases as surface of the electrode is traversed in the direction of gas flow. Also, since the reaction is exothermic, there is an autocatalytic heating effect tending to further increase the reaction rate at the gas inlet side of the cell. In general, the reaction rate, heat flux, and current density are thus very high at the gas inlet side of the cell and drop off rapidly in the direction of gas flow. A theoretical current density profile for a conventional electrode is illustrated in FIG. 1, which presents current density (line "A") and catalyst loading (line "B") versus distance from the gas inlet side of an electrode. For a uniform catalyst loading, current density drops off rapidly in the direction of gas flow.

Figure 2:
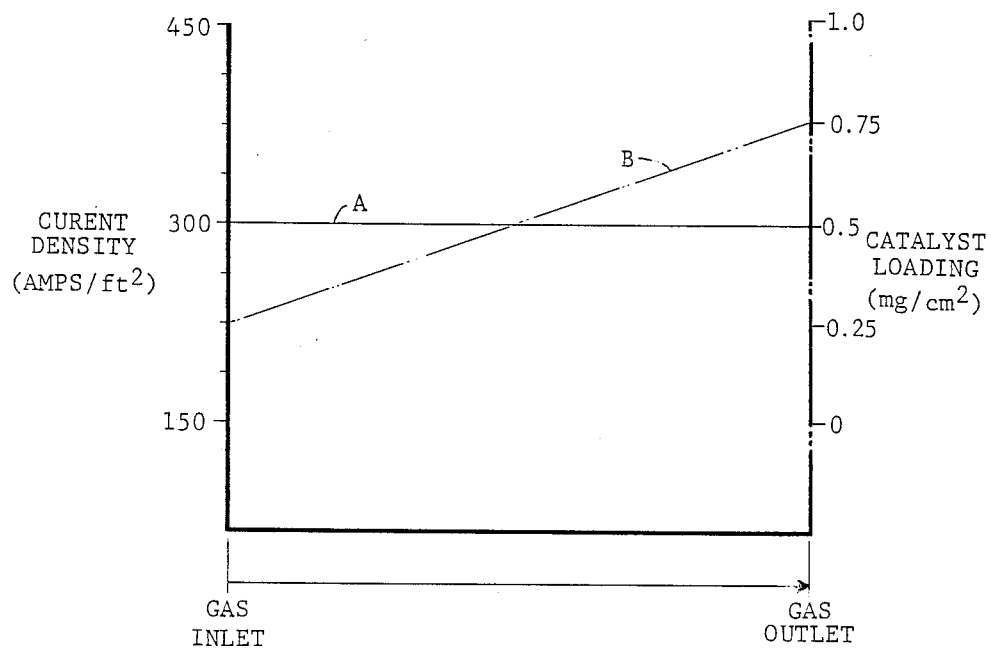
FIG. 2 shows the relationship between catalyst loading, B, and current density, A, to location on an electrode of the present invention.

In a fuel cell of the present invention, the gas stream is reactant rich at the gas inlet side of the cell. However, the catalyst loading at the gas inlet side of the cell is relatively low. As the gas stream approaches the outlet side of the plate, the gas is depleted in reactants. Catalyst loading increases approaching the outlet side of the cell. Ideally, the effect of the increased catalyst loading in the direction of gas flow balances the effect of the depletion of reactants in the gas stream to result in a reaction rate that is substantially uniform across the surface of the plate. The associated heat flux and current density are also roughly uniform across the surface of the plate. A theoretical current density profile for an electrode of the present invention is illustrated in FIG. 2, which presents current density (line "A") and catalyst loading (line "B") versus distance from the gas inlet side of an electrode. For a graded catalyst loading, the current density is shown to remain relatively uniform across the electrode.

EXAMPLE

An electrode according to the present invention may be manufactured according to the following procedure.

A 2300cm$^3$ flat carbon paper substrate of selected uniform porosity, density and pore size is fabricated according to the process of U.S. Pat. No. 4,426,340.

A dry mechanically blended powder mixture comprising 43% by weight PTFE and 55% catalyzed carbon may be used. The catalyzed carbon comprises 10% by weight platinum and 90% by weight carbon. The particle size of the carbon is on the order of one micron or less. The PTFE is purchased as TFE-6 manufactured by DuPont; it is a dry powder having a molecular weight of about $1 \times 10^6$ and a particle size of over 100 microns. The PTFE particles are reduced in size in a Bantam Mikro-Pulverizer manufactured by Mikropul, Summit, N.J. and then blended with the catalyzed carbon particles until a uniform mixture is obtained. The preliminary size reduction of the TFE-6 is optional and may be omitted. The mixture is then put into a Jet-O-Mizer manufactured by Fluid Energy Processing and Equipment Co. of Hatfield, Pa. which reduces the powder to an estimated mean particle size of about one micron or less and further improves the uniformity and dispersion of the two powders.

The carbon paper substrate is positioned on the vacuum plate in the cloud chamber. A vacuum plate having two rectangular independently regulated zones of 1150cm$^2$ each supports the paper. A vacuum of about 2 inches to 4 inches of water is drawn on one zone and a vacuum of about 8 inches to 10 inches of water is drawn on the other zone and 22.28 grams of the above described catalyst mixture is released into the chamber above the substrate. Assuming that about 10% of the powder will pass through the substrate, the amount of powder will yield a platinum catalyst coating of about 0.5mg/cm$^2$ averaged over the entire surface area of the substrate. The non-uniform pressure differential across the substrate results in a non-uniform distribution of platinum, with a platinum catalyst loading of about 0.25mg/cm$^2$ over the area of the substrate subjected to the lower vacuum and with a platinum catalyst loading of about 0.75mg/cm$^2$ over the area of the substrate that is subjected to the higher vacuum. The precise amount of powder and vacuum adjustments necessary to achieve the desired distribution is readily determined by making several trial electrodes.

The substrate with the applied coating is covered with a protective sheet of poster board lightly coated with carbon and compacted between a pair of rollers at a pressure of about 15 pounds per linear inch. The compacted article is then heated in an oven at temperature of 640° F. for 10 minutes to sinter the PTFE.

The catalyst distribution of the fuel cell electrode of the present invention provides a substantially uniform reaction rate across the electrode surface during the operation of a fuel cell utilizing the electrode. The substantially uniform reaction rate results in a substantially uniform current density and a substantially uniform heat flux across the electrode. The substantially uniform current density improves cell performance by minimizing the deviations from Tafel behavior. The substantially uniform heat flux simplifies and reduces the expense associated with means for cooling the fuel cell.

Although this invention has been shown and described with respect to detailed embodiments thereof, it will be understood by those skilled in the art that various changes in form and detail thereof may be made without departing from the spirit and scope of the claimed invention.

I claim:

1. A process for applying a catalyst layer to a surface of a porous substrate to form a fuel cell electrode, said substrate having an upper surface and a lower surface, comprising:
   contacting the upper surface of the substrate with a mixture comprising a hydrophobic polymer and a catalyst; and
   establishing a selected distribution of reduced pressure over the lower surface of the porous substrate to cause the mixture to be deposited in a layer of non-uniform thickness on the upper surface of the porous substrate, said thickness increasing along one axis of the upper surface so that the electrode has a catalyst loading per unit area of the upper surface that increases along the one axis.

2. The process of claim 1 wherein the mixture additionally comprises an inert carrier gas to form a fluidized mixture and the substrate is an electrode substrate.

3. The process of claim 1 wherein the mixture additionally comprises water to form an aqueous suspension of flocced particles.

4. The process of claim 3 wherein the substrate is an electrode substrate.

5. The process of claim 3 wherein the substrate is a filter medium and the non-uniform layer of catalyst coposition is transferred from the filter medium to a surface of an electrode substrate.

6. The process of claims 1, 2, 3, 4, or 5 wherein the hydrophobic polymer comprises polytetrafluoroethylene.

7. The process of claims 1, 2, 3, 4, or 5 wherein the catalyst comprises an alloy of platinum, chromium and cobalt dispersed on carbon particles.

8. The process of claims 2, 3, 4 or 5 wherein the electrode substrate is porous carbon paper electrode substrate.

* * * * *